US010850487B2

(12) United States Patent
Clausi et al.

(10) Patent No.: US 10,850,487 B2
(45) Date of Patent: Dec. 1, 2020

(54) PRESSED LAMINATE PANEL WITH A SINGLE LAYER ELASTOMERICK TREATED PAPER

(71) Applicants: Robert Clausi, Oakville (CA); Salvatore Diloreto, Ancaster (CA)

(72) Inventors: Robert Clausi, Oakville (CA); Salvatore Diloreto, Ancaster (CA)

(*) Notice: Subject to any disclaimer, the term of this patent is extended or adjusted under 35 U.S.C. 154(b) by 0 days.

(21) Appl. No.: 15/745,728

(22) PCT Filed: Jul. 22, 2016

(86) PCT No.: PCT/CA2016/050867
§ 371 (c)(1),
(2) Date: Jan. 18, 2018

(87) PCT Pub. No.: WO2017/015749
PCT Pub. Date: Feb. 2, 2017

(65) Prior Publication Data
US 2018/0222169 A1 Aug. 9, 2018

Related U.S. Application Data
(60) Provisional application No. 62/196,768, filed on Jul. 24, 2015.

(51) Int. Cl.
B32B 29/06 (2006.01)
B32B 21/06 (2006.01)
(Continued)

(52) U.S. Cl.
CPC .............. B32B 29/06 (2013.01); B32B 3/28 (2013.01); B32B 15/12 (2013.01); B32B 15/18 (2013.01);
(Continued)

(58) Field of Classification Search
CPC ......... B32B 21/08; B32B 21/14; B32B 27/32; E04F 15/102; Y10T 428/24066; Y10T 428/24124
(Continued)

(56) References Cited

U.S. PATENT DOCUMENTS

2005/0281997 A1 12/2005 Grah
2008/0187710 A1 8/2008 Stanchfield
(Continued)

FOREIGN PATENT DOCUMENTS

EP 2223800 9/2010

OTHER PUBLICATIONS

International Search Report issued in PCT/CA2016/050867, dated Sep. 12, 2016, pp. 1-6.
(Continued)

Primary Examiner — Betelhem Shewareged
(74) Attorney, Agent, or Firm — Jeffrey S. Melcher; Melcher Patent Law PLLC

(57) ABSTRACT

A laminated panel is provided which comprises, or consists of, a core panel to which an elastomeric resin impregnated single finishing printed paper layer has been applied. The paper for the single finishing printed paper layer is printed to provide a design feature on the laminated panel. Preferably, the design feature has been printed on a lower surface of the single finishing printed paper layer. As a result of the resin impregnation and heating and pressing operations, the single finishing printed paper layer becomes translucent or transparent, and thus allows the printed design feature to become visible. The design feature can be printed onto the single finishing printed paper prior to treatment with the elastomeric resin, or printed onto the previously treated
(Continued)

elastomeric resin impregnated paper. The laminated panels can be used in the production of laminated flooring, wall panels or furniture panels.

4 Claims, 5 Drawing Sheets

(51) Int. Cl.
    *B32B 27/10*     (2006.01)
    *B32B 15/12*     (2006.01)
    *B32B 21/14*     (2006.01)
    *B32B 21/02*     (2006.01)
    *B32B 15/18*     (2006.01)
    *B32B 27/04*     (2006.01)
    *B32B 15/20*     (2006.01)
    *B32B 3/28*     (2006.01)

(52) U.S. Cl.
    CPC .............. *B32B 15/20* (2013.01); *B32B 21/02* (2013.01); *B32B 21/06* (2013.01); *B32B 21/14* (2013.01); *B32B 27/04* (2013.01); *B32B 27/10* (2013.01); *B32B 2260/028* (2013.01); *B32B 2260/048* (2013.01); *B32B 2264/102* (2013.01); *B32B 2307/412* (2013.01); *B32B 2307/414* (2013.01); *B32B 2307/546* (2013.01); *B32B 2307/732* (2013.01); *B32B 2307/75* (2013.01); *Y10T 428/24802* (2015.01); *Y10T 428/24851* (2015.01)

(58) Field of Classification Search
    USPC ....................................................... 428/211.1
    See application file for complete search history.

(56) References Cited

U.S. PATENT DOCUMENTS

| | | |
|---|---|---|
| 2010/0083603 A1 | 4/2010 | Goodwin |
| 2011/0300351 A1 | 12/2011 | Suur-Nuuja |
| 2012/0055112 A1* | 3/2012 | Engstrom ......... E04F 15/02144 52/582.2 |
| 2012/0103722 A1* | 5/2012 | Clausi .................... B32B 25/14 181/294 |
| 2012/0276348 A1 | 11/2012 | Clausi |
| 2014/0170359 A1 | 6/2014 | Schwitte |
| 2014/0199529 A1 | 7/2014 | Hoff |
| 2014/0242342 A1 | 8/2014 | Vandevoorde |
| 2018/0222169 A1* | 8/2018 | Clausi .................... B32B 21/06 |

OTHER PUBLICATIONS

Written Opinion issued in PCT/CA2016/050867, dated Sep. 12, 2016, pp. 1-6.

\* cited by examiner

PRESSED LAMINATE PANEL WITH A SINGLE LAYER ELASTOMERICK TREATED PAPER

FIELD OF THE INVENTION

The present invention relates to the field of laminated panels, and in particular, relates to laminated panels having a core panel and a single, printed, elastomeric resin-treated paper layer. The laminated panels are used in the manufacture of laminate flooring, furniture and wall panels.

BACKGROUND OF THE INVENTION

Typical laminated panels for the production of flooring, furniture and walls have a multi-layer structure comprised of a solid core panel, and multiple treated paper layers, which paper layers typically include an overlay wear layer, a decorative layer, and a balancing layer. The overlay wear layer and the decorative layer are typically provided on one side of the core panel, and the balancing layer is provided on the opposite side of the core panel.

The core panel is typically a natural fibre-containing layer, and usually is an MDF (medium density fibreboard) or HDF (high density fibreboard) panel, or a particle board panel, or the like. The treated paper layers are usually sheets of paper that have been impregnated with an amino resin, such as for example, a rigid melamine formaldehyde resin, and then dried to form a melamine-treated paper layer. The various layers, including the core panel and the various melamine-treated paper layers, are then assembled together as a laminated panel structure, and this structure is pressed together under heat, to form the laminated panel. During the pressing process, the action of heat and pressure on the amino resin treated papers acts to liquefy and cure the amino resin, and thereby bond the various individual layers to each other, and to the core panel.

Typically, the printed, melamine-treated, decorative paper layer is used to give the pressed panel a specific design appearance. For example, the decorative paper can be printed so as to appear to be wood-grain panels, or the like, or to provide other appearances, such as stone or ceramic tiles, or the like. Prior to printing, the decorative paper layer is opaque, and coloured so as to form a base colour for the printed image, and so as to hide the appearance of the core panel, from view. The image can be printed onto the decorative paper layer using any suitable printing technique.

A melamine-treated, transparent overlay paper layer is also typically applied over the decorative paper layer, for applications such as flooring, so as to act as a wear layer where the extra durability of the wear layer would be necessary or beneficial. This wear layer can include abrasion resistant particles, such as aluminum oxide, or the like, to provide enhanced durability of the panel surface. When covered by the transparent wear layer, the pattern printed on the paper of the decorative layer, is still visible to the user, through the transparent wear layer.

The decorative layer, and the overlay layer are typically positioned on one side of the laminated panel, and a melamine-treated paper balancing layer is usually required to be placed on the other side of the core panel. This balancing layer is used to aid in creating a sandwich structure around the core panel, with equal stresses on both sides of the core panel which ensures that the pressed panel will remain flat and stable.

The laminated panels are typically produced by a production technique known as DPL (Direct Pressure Laminate), in which flat sheets of the various component layers are assembled together above and below the core panel, and the entire loose assembly is placed into a press and compressed, while heating, in order to become one hardened whole. Other production techniques are also known, however. For example, first a top layer may be formed which, amongst others, comprises the aforementioned decorative layer and the wear layer which are combined together, with one or more kraft paper base layers than have been treated with a phenolic resin, and pre-pressed. This pre-formed top layer is subsequently bonded with an adhesive, to a core panel, by pressing and heating. This technique is known as HPL (High Pressure Laminate).

In either case, the resulting pressed panels usually have a realistic looking appearance. In order to further enhance the appearance of the laminated panels, the pressed panels may also include an embossed texture which has been applied to the laminated panel during pressing, so as to create a realistic textured panel surface. This is commonly done using a register embossing system, which system is currently known to those skilled in the art.

Using these techniques, large volumes of laminated panel products, useful for applications in flooring, panel, and furniture construction, are commercially produced and are widely available.

However, the rigid melamine treated papers of the prior art, which are used in the decorative layer, the wear layer and/or the balancing layer, have many disadvantages in the production of laminated panels. Amongst these problems are that the melamine resin treated papers have a short shelf life of less than 6 months, after which they are not useable. Further, the treated papers are difficult to ship long distances because they are sensitive to heat and moisture, and must be shipped and stored in temperature controlled environments. The melamine treated papers are also difficult to handle because they are brittle and crack easily, causing visible surface defects in pressed panels. Melamine treated papers also have brittle edges that can crack or break easily when cut or machined during the manufacturing process. The melamine treated papers also create dust when they are cut which can create additional manufacturing problems during subsequent cutting and machining operations.

Also, because of the stresses from the cured melamine resin decorative and wear layers on one side of the core panel, the use of a balancing layer is typically mandated so as to offset these stresses, and ensure that the pressed panel will remain flat and stable without warping. This adds to the cost of the laminate panel.

Consequently, during production, the manufacturers of laminated panels typically must maintain large inventories of flat sheets of the very delicate and brittle melamine resin-treated overlay papers (wear layer), treated decorative papers and treated backing papers. Storage of large volumes of these flat, treated sheets of various different types, shapes and sizes, and produced on different dates, can be problematic and/or can add to the cost of manufacture of the panels.

As such, it would be advantageous to provide a laminated panel structure that eliminates and/or ameliorates some or all of the disadvantages of the use of multiple layers of rigid melamine-resin treated papers during the production of laminated panels.

SUMMARY OF THE INVENTION

An exemplary implementation of a laminated panel of the present invention provides a laminated panel having a core panel, and having a finishing printed paper layer, on at least one side of the core panel, which finishing printed paper layer has been treated with, or impregnated with, an elastomeric resin, prior to production of the laminated panel. The finishing printed paper layer is therefore defined as a single paper-based layer that has been printed, and functions as both a decorative layer and a wear layer (or overlay layer). This approach of using only a single finishing printed paper layer, provides the functionality of a printed decorative layer and a wear layer, while avoiding or reducing the application of stresses on the core panel. Through this approach, the need for a separate paper decorative layer, separate wear layer, and even a separate balancing layer, can be avoided. This approach not only lowers the production cost of the laminate panel, it also allows for use of a thinner core panel because of the reduction or elimination of the stresses on the core panel.

Accordingly, in a first aspect, the present invention provides a laminated panel comprising, and more preferably, consisting of, a core panel and a treated layer on at least one side of the core panel, which treated layer comprises, and more preferably, consists of, a single finishing printed paper layer which finishing printed paper layer has been treated with, or impregnated with an elastomeric resin, prior to production of said laminated panel.

The treated layer may be printed, before or after impregnation, of the paper with elastomeric resin. Preferably, the image printed onto the paper, is applied to the side of the paper which will be located next to the core panel. In this case, the treated, resin-impregnated paper is, or becomes transparent, when cured. As a result, the image may need to be printed in reverse, so as to provide a proper orientation after pressing. In general, the image printed can be any suitable graphic image, design graphic, colour, geometric pattern, logos, text, or the like, or any combination thereof.

The paper used in the production of the single finishing printed paper layer is preferably similar to, or identical to the papers currently used in the production of the overlay layer in prior art laminated panels. The paper can be of any suitable thickness, weight or strength, provided that it provides the performance requirements of the flooring or panel producer, and is strong enough for use in the printing process, the resin impregnation step, and/or the laminated panel pressing operation. Typically, the paper will have a strength which is at least similar to current production papers.

The single finishing printed paper layer preferably includes abrasion resistant particles, such as aluminum oxide, or the like, to provide enhanced durability of the panel surface. The paper itself may contain the abrasion resistant particles (ARP), or the particles can be applied to the surface of the paper using a typical ARP scattering or coating system, known to those skilled in the art.

The printed paper, once treated with the elastomeric resin, can be opaque to form a solid background colour for the printed image. Where a paper is used after an image such as a wood grain, or the like, has been applied, an additional solid background colour may optionally be applied to the paper to mask the core panel. Where the paper is used over a natural wood or a wood veneer, the single finishing printed paper layer is, or preferably becomes, translucent or even more preferably, becomes transparent after application of the elastomeric resin, and/or after pressing to form the laminated panel. This allows the image printed onto the paper to be visible after the laminated panel has been pressed.

The paper may be printed using any suitable standard printing technology. This can include suitable printed techniques for both large and small production runs. For example, for larger production runs, techniques such as commercial offset printing or the like, could be used to print the single finishing printed paper, while for smaller production runs, the single finishing printed paper can be printed with commercial ink-jet printing technology. In general though, any commercial printing method might be used to apply the decorative image to the paper.

Preferably, the ink used during the printing process is essentially inert with respect to the elastomeric resin, meaning that the printed image is largely unaffected by the application of, or the impregnation of, the paper with the elastomeric resin.

Preferably, the paper is printed before application of, or impregnation of, the paper with the elastomeric resin, and thus printed on the dry paper prior to treatment, or impregnation of the paper. However, the paper may be printed after the application of, or the impregnation of, the paper with the elastomeric resin. However, applying the elastomeric resin to the paper prior to printing may also be of interest since typically, the application of the elastomeric resin improves the strength of the paper. In this approach, the elastomeric resin would preferably be dried, but not cured, prior to printing.

Typically, the treated or impregnated paper of the of the present invention is stronger and more flexible than the corresponding rigid melamine resin papers, and also typically provides a longer shelf life. Further, the resultant treated or impregnated paper is not brittle, and is less prone to cracking than prior art rigid melamine treated papers. As a result, a stronger, more flexible paper is produced, or alternatively, a thinner paper can now be used for production, while still providing treated or impregnated papers which are strong enough for printing.

As a consequence, the present invention provides, in a preferred embodiment, a technique for producing printed treated or impregnated papers, as a separate product that can be shipped in either sheet or roll-form, and then used in either a sheet or roll-form, for production of laminated panels having a core panel and a single finishing printed paper layer.

Once the treated or impregnated papers are produced, the desired image may also be printed directly onto the treated or impregnated paper using paper provided in either a sheet or roll-form. The printed paper is still flexible enough that it can be re-rolled, if desired, and thus shipped to, or used by, the manufacturer in either the sheet form, or in roll-form.

In a preferred approach, the printed image is printed on the side of the paper which is intended to be proximate to, or otherwise adjacent to, the core panel (hereinafter termed as the "lower" surface of the paper). However, in order to view the image printed on the lower surface of the paper, the paper used is, or will become at least translucent, and more preferably transparent, after the elastomeric resin is applied, and the laminated panel is pressed and heated. Thus, selection of an elastomeric resin which causes the paper to become translucent or transparent after treating or impregnating the paper and/or pressing the laminate structure, is preferred.

Using this approach, the images printed on the lower surface of the single finishing printed paper layer, will be visible, through the single finishing printed paper, once the laminated panel is produced. By printing on the lower surface of the single finishing printed paper, the printed image is more fully protected from abrasion and the like, by the treated or impregnated paper.

As such, in a further aspect, the present invention provides a method for the manufacture of a laminated panel comprising, or more preferably, consisting of:

(i) preparing a flexible, treated or impregnated single finishing printed paper layer by:
   (a) printing an image onto a paper layer, and treating the resultant printed paper layer with an elastomeric resin, and thus produce the flexible, treated or impregnated single finishing printed paper layer; or
   (b) treating a paper layer with an elastomeric resin to produce a treated or impregnated paper layer, and then printing an image onto said treated or impregnated paper layer to produce the flexible, treated or impregnated single finishing printed paper layer;
(ii) placing the flexible, treated or impregnated single finishing printed paper layer adjacent to at least one side of a core panel, as a laminate structure, in a laminate panel press;
(iii) pressing said laminate structure, with heating, in said press; and
(iv) optionally embossing said laminate structure in said press, so as to produce a laminated panel.

The image printed on the paper may be a semi-transparent colour, or an image that covers only a portion of the paper, and thus, allow at least part of the surface of the core panel to be visible. However, the printed paper may also be a solid printed image, or a printed background colour or image, which ensures that the final printed image will substantially block the visibility, or the colour, of the core panel. It will be noted that use of this technique will aid in eliminating any need for a separate opaque paper layer that would be used to block the colour or features of the core panel.

The printed image can be any suitable size or shape, and may be scaled to allow for shrinkage or expansion of the paper during the elastomeric resin treatment process, and/or the pressing or optional embossing stages. During the optional embossing stage, a textured pattern can be applied to the panel which will preferably match the underlying printed image in the design of the finished laminated flooring, furniture or wall panel. This can be achieved using a registered embossing technique wherein texture is applied to the panel so that the texture matches the printed image. For example, if the panel includes the image of a wood grain, the panel is embossed with a wood grain texture that matches the printed image, and thus provides the impression and feel of a natural wood product.

The elastomeric resin used in the practise of the present invention is preferably applied using any suitable technique. Preferably, the paper is treated so as to impregnate the paper, wherein a treated paper layer is produced having the elastomeric resin situated throughout the paper. This technique is known with other resin systems, and thus, the treated paper can be produced with standard paper impregnation treating equipment and requires no new or specialized capital equipment to be purchased.

The elastomeric resins of interest in the present invention preferably comprise natural and/or synthetic resins, or combinations thereof, having with elastomeric properties. Thus, typical elastomeric resins of interest in the practise of the present invention include any one or a combination of elastomeric thermosetting or thermoplastic resins including polyethylene (PE), including all grades such as LLDPE (Linear low-density polyethylene), LDPE (Low-density polyethylene), MDPE (Medium-density polyethylene), HDPE (High-density polyethylene); Polyurethanes; Polypropylene; Ethylene vinyl acetates; Ethylene vinyl alcohol; Polyesters; Polyolefin (including TPO (Thermoplastic Polyolefin)); elastomeric-modified Melamine thermoset resins, Urea and Urea-modified thermoset resins; ESI (ethylene styrene interpolymer), or any of the styrene acrylic copolymers and Acrylic resins; rubber based materials, such as NBR (nitrile Butadiene), SBR (styrene butadiene), CR (chloroprene), silicone, fluorocarbon, acrylamide, epichlorohydrin, and/or carboxylated natural and synthetic latexes; or combinations thereof.

The elastomeric resin can be made from any of the above materials, and used in any suitable form, including liquid, solid or film material. However, preferably the elastomeric resin is provided as a liquid material that is applied to the paper, using traditional impregnation equipment and techniques. Most preferably the elastomeric resin is provided as a one component or multi-component solution polymer, or one component or multi-component water-based or solvent-based dispersion, emulsion, or latex.

In general, by use of elastomeric resins, the treated or impregnated paper becomes somewhat elastic, and typically more elastic than prior art melamine-based treated or impregnated papers. Consequently, when pressed onto the core panel during pressing, less stress is applied to the core panel by the more elastic single finishing printed paper. This allows the core panel to remain more stable.

This is in contrast to the stresses produced by using the more rigid melamine based resins. As a result of this stress reduction, the present invention allows a paper layer to be applied to only one side of the core panel, without the need for a balancing layer. As such, the use of a balancing layer is optional, and can be eliminated, if desired, or replaced by, other materials, such as, for example, simple coating materials such as a paint or varnish, or a similar product.

Additionally, a single finishing printed paper layer impregnated with an elastomeric resin can be applied to both the upper and lower surfaces of a core panel. The single finishing printed paper layer used for each side can be the same or different, and thus provide a laminated panel having a different appearance on, or having different properties on, each side of the panel. For example, in this manner, a panel could be produced having a wood grain on one side, and a stone image on the other side. Alternatively mixed or contrasting wood grain images could be applied to the panel surfaces so that, for example, a flooring customer could have a panel having two distinct flooring colours, or the like, on opposite sides of the panel. Further, the gloss of the two sides of the panel could be varied so that the user could decide on the gloss of the floor during installation. These types of panels could optionally include a reversible joining system to allow each panel to be flipped. This approach would allow the manufacturer and retailer to inventory smaller amounts of product since two different laminate panel images, or features, would be available on each panel.

Moreover, each side of the laminate panel can be embossed, as previously discussed.

Preferably, in the practise of the present invention, the core panel is a natural fibre-based material, and in particular, the core panel is a natural wood core, a plywood core or a particleboard core. Alternatively, the core panel can be a plywood, or other engineered wood core. Further, the core panel can be a wood veneer material in which a wood veneer is bonded to a base panel of any one of these other materials. Most preferably though, the core panel is an MDF or HDF wood-based panel made from natural fibers and using PMDI or formaldehyde, or other binders and other additives. Variations in the type of natural fibers to produce the core panel, the density of the natural fiber based core panel, the use of different resins or bonding agents, or composites made with combinations of different fibers, are all possible in the practise of the present invention.

Further, the core panel can also be made of other materials which may include synthetic materials, such as wood-plastic composite materials or plastic materials, or include metallic materials, such as aluminum or steel materials.

Still further, the core panel can be a material that has been prepared prior to the production of the laminated panels of the present invention. For example, it is noted that manufacturing wood veneer panels is an expensive process that requires a wood veneer layer to be glued to a fibre-based core. Expensive finishing materials, which include colour stains, sealers, and multiple UV or air-dry coatings made from polyurethane or acrylic resins, are applied to produce a wood veneer having the desired appearance. However, in the practise of the present invention, a wood veneer panel can be produced and used as a core panel, and a treated printed paper layer, in one or more transparent or semi-transparent colours, can be pressed and optionally embossed over the wood veneer core panel, to produce a wood veneer having a desired finish.

The semi-transparent elastomeric treated layer applied over a standard wood veneer allows a new way to manufacture wood veneer panels in a variety of colours by simply applying a coloured treated single finishing printed paper that allows the natural wood grain to show through. This eliminates the need for treatment of wood veneer panels with liquid stains, wiping, drying, applying a sealer, sanding and finally applying multiple coats of protective finishes.

Using the technique of the present invention, manufacturing of the finished veneer panel can be done with, for example, a standard short-cycle press of the type that is currently used in the production of prior art laminate flooring.

As such, in a further aspect, the present invention provides a veneer product, and a method for the production of a veneer product, wherein a printed, flexible single finishing printed paper, which flexible single finishing printed paper has been treated with, or impregnated with, an elastomeric resin, which is placed adjacent to a veneer panel, and subsequently pressing said veneer panel, and said flexible single finishing printed paper, in a press to produce a laminated veneer product.

The laminated veneer product comprises, or more preferably consists of, a core panel of a wood veneer, and a single finishing printed paper layer adjacent to the veneer layer of said wood veneer core panel, which single finishing printed paper layer comprises, or more preferably consists of, a single printed paper layer which printed paper layer has been treated with, or impregnated with an elastomeric resin, before or after printing an image onto said paper layer, and prior to production of said laminated panel.

BRIEF DESCRIPTION OF THE DRAWINGS

Embodiments of this invention will now be described by way of example only in association with the accompanying drawings in which.

DETAILED DESCRIPTION OF THE PREFERRED EMBODIMENTS

Figure 1:
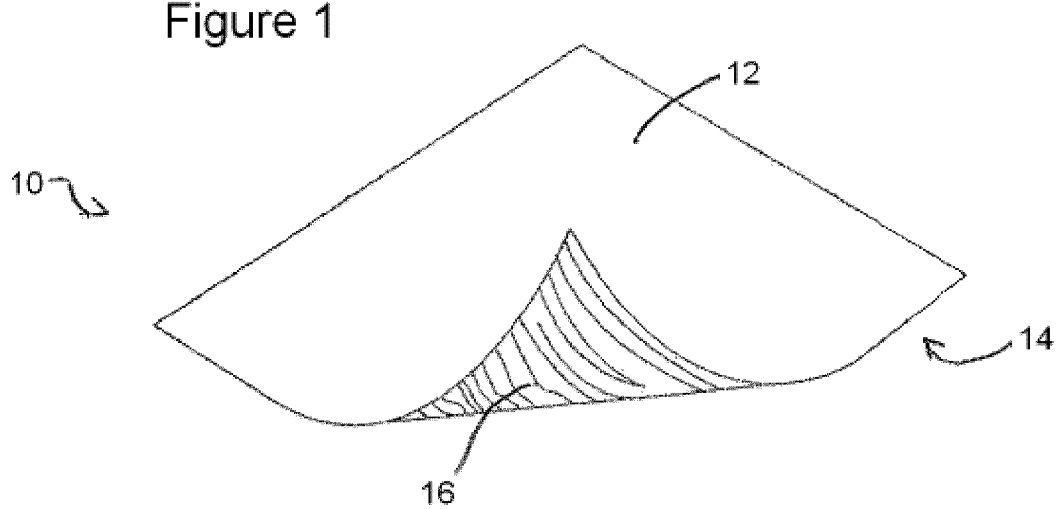
FIG. 1 is a perspective view of a printed paper layer, of use in the practise of the present invention.

The novel features which are believed to be characteristic of the present invention, as to its structure, organization, use and method of operation, together with further objectives and advantages thereof, will be better understood from the following drawings in which a presently preferred embodiment of the invention will now be illustrated by way of example only. In the drawings, like reference numerals depict like elements.

It is expressly understood, however, that the drawings are for the purpose of illustration and description only and are not intended as a definition of the limits of the invention. Also, unless otherwise specifically noted, all of the features described herein may be combined with any of the above aspects, in any combination.

Referring to FIG. 1, a perspective view of a paper 10, according to the present invention, is shown. Paper 10 is an opaque paper having a weight of 30 $g/m^2$, prior to treatment, and has an upper surface 12, and a lower surface 14. A wood grain pattern 16 has been printed onto the lower surface 14 of paper 10.

Figure 2:
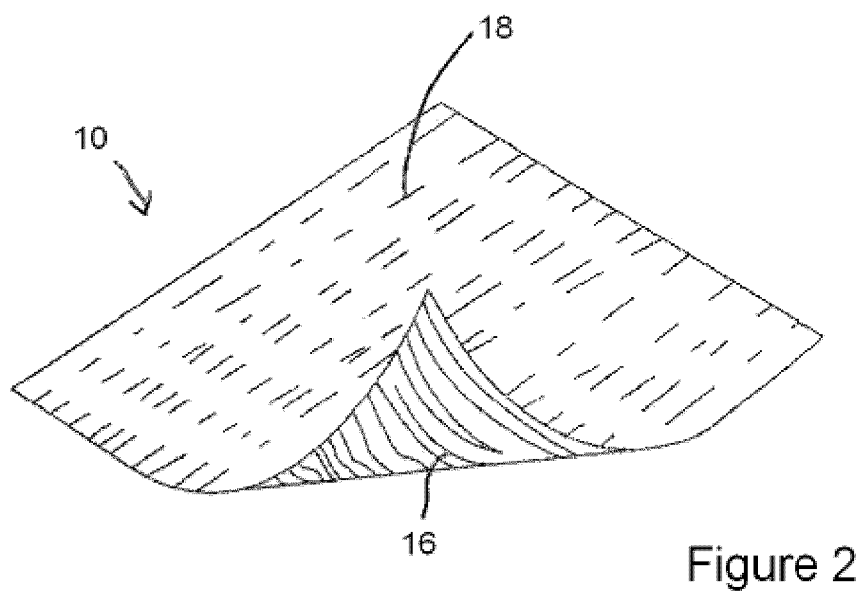
FIG. 2 is a perspective view of the same paper layer, after impregnation with an elastomeric resin.

In FIG. 2, paper 10 has been impregnated with an elastomeric resin, and as a result of this impregnation, paper 10 has become translucent. As such, the wood grain pattern 16 printed onto the lower surface 16 of paper 10, is now partially visible, as wood grain image 18, on the upper surface 12 of paper 10.

The thickness of paper 10 after impregnation by the elastomeric resin, is preferably between 0.1 to 3 mm, but thinner or thicker papers also be used. The overall weight of paper 10 after impregnation is preferably between 40 and 300 $g/m^2$, and more preferably between 50 and 250, and still more preferably between 100 and 200 $g/m^2$. Preferably, the elastomeric resin is in the form of a water-based dispersion, or a water-based or solvent-based solution polymer, and which has been applied to the paper by known impregnation devices.

In more detail, in the embodiment shown in FIG. 2, the 30 $g/m^2$ paper, optionally containing aluminum oxide particles, is impregnated with a water-based polyurethane resin system, such as Flexcoat WB-400 or WB-420 (both available from Purchem Systems Inc.), to provide an impregnated single finishing printed paper having a final weight after drying, of 100 $g/m^2$.

Figure 3:
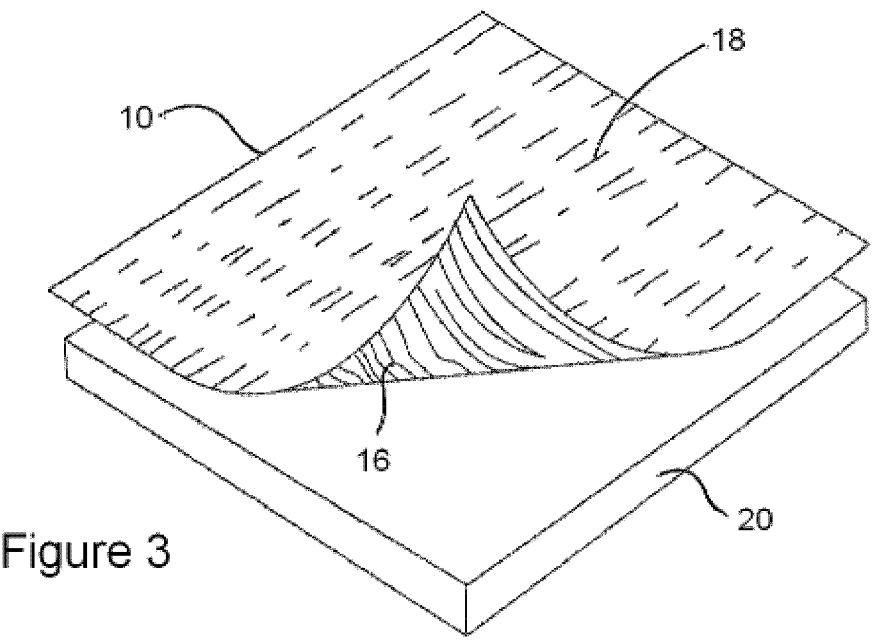
FIG. 3 is a perspective view of the impregnated paper layer of FIG. 2 positioned over a core panel.
Figure 4:
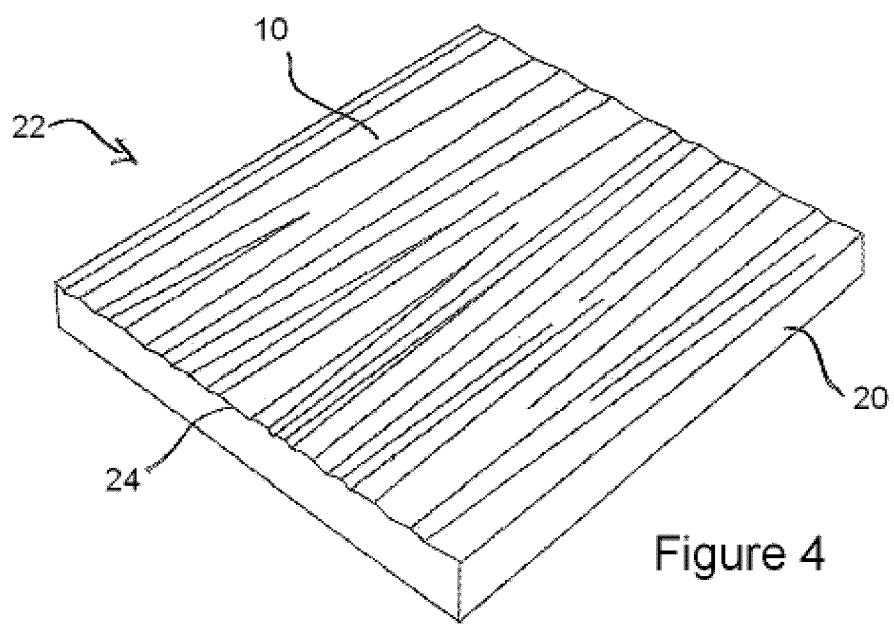
FIG. 4 is a perspective view of the paper layer and core panel of FIG. 3, after pressing and embossing.

During production of a laminate panel, translucent finishing printed paper 10 is placed on one side of an MDF core panel 20, as shown in FIG. 3. The loose paper 10 and core panel 20, are assembled together as a laminate structure, and this structure is pressed together, with heating, to produce the laminated panel 22, shown in FIG. 4. As part of the pressing operation, the impregnated resin cures, and provides adhesion of the finishing printed paper to the core panel. As such, as a result of pressing, the finishing printed paper 10 is pressed onto core panel 20, and adheres to the core panel 20, without the need for any glue or other adhesives, or the like.

The pressing operation can be achieved using any one of a variety of pressing processes, but preferably pressing is done using existing short-cycle presses, and in particular, direct pressure laminate (DPL) processes. However, depending on the resin selected, the elastomeric treated, finishing printed paper can provide a wide processing window. Preferably though, the laminate structure is pressed at temperatures and pressures normally used in the production of prior art laminate panels. For example, the laminate structure could be heated to 120 degrees C. to 140 degrees C. for 3 minutes under a surface pressure of 20 to 70 kg force per $cm^2$ of surface area. Other temperatures and pressure can be used, however.

Once the pressing operation is complete, single finishing printed paper 10 becomes transparent, so that the wood grain pattern 16 is now fully visible through paper 10. Also, because of this transparency, the surface of core panel 20 is at least partially visible through paper 10.

In other embodiments, the lower surface 14 of single finishing printed paper 10 can be printed to show a wood pattern, and/or a desired wood panel colour. When applied to the core panel 20, the wood panel pattern and colour would further hide appearance of the surface of core panel 20.

Additionally, simultaneously to pressing, laminated panel impressions can be preferably applied by the press, as the surface of the pressing part comes into contact with the upper surface of single finishing printed paper 10. In this option, the pressing plate includes the desired relief features which features are transferred to panel 22. After curing of the elastomeric resin, the resultant laminated panel 22 includes the embossed textured feature 24. Preferably, the embossed texture depth may range from essentially flat and smooth, with a glossy or matt finish, or a texture that is pressed 0.05 to 0.6 mm below the pressed panel surface providing for a realistic looking finished panel.

Figure 5:
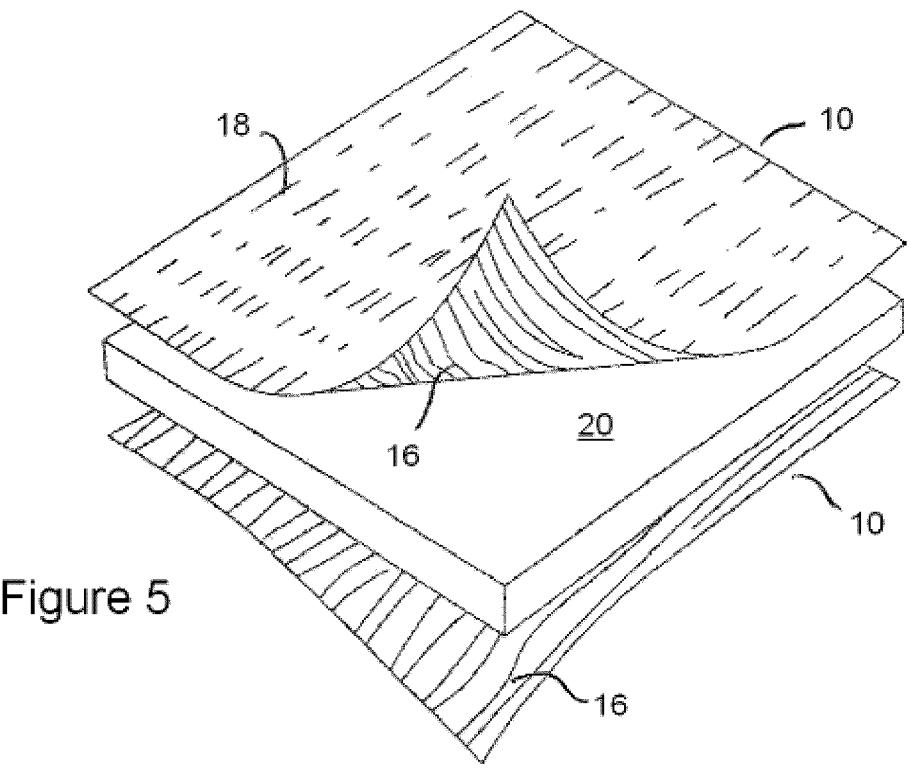
FIG. 5 is a perspective view of a core panel, with an impregnated paper layer on each side of the core panel.

In FIG. 5, a second embodiment of the present invention is provided wherein an MDF core panel 20 has an elastomeric resin impregnated single finishing printed paper layer 10, as described in FIGS. 1 and 2, on each side of the core panel, and this laminate structure can be pressed, as previously described.

Figure 6:
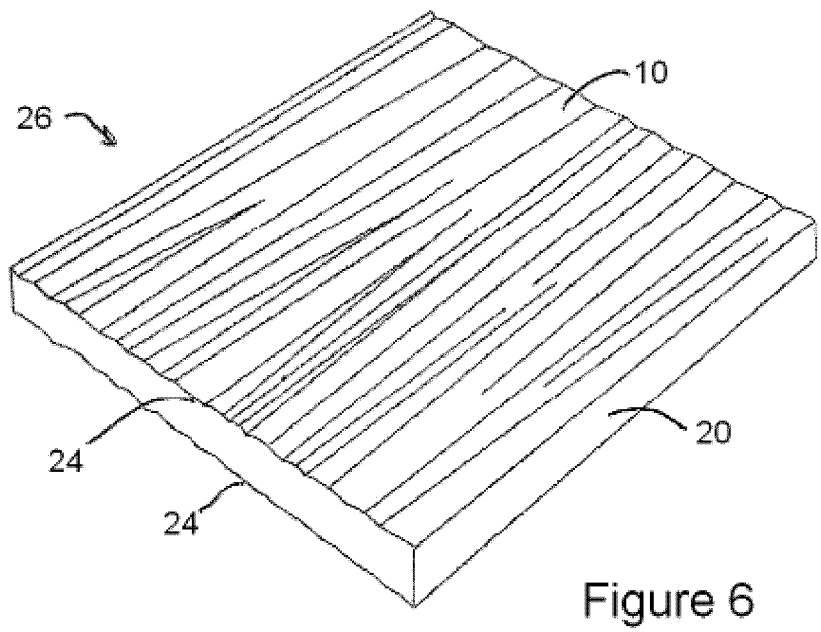
FIG. 6 is a perspective view of the core panel and papers of FIG. 5, after pressing and embossing.

After pressing and embossing, laminated panel 26 is provided having a textured, wood grain finish on both its upper and lower surface. While the textured wood grain finish as shown in FIG. 6, can be essentially identical on both the upper and lower surfaces of panel 26, this is not required or preferred. In fact, in one preferred embodiment, the appearance of the two surfaces can vary, one from the other. This provides flexibility in the manufacturing of a wide variety of different panel designs and features.

Figure 7:
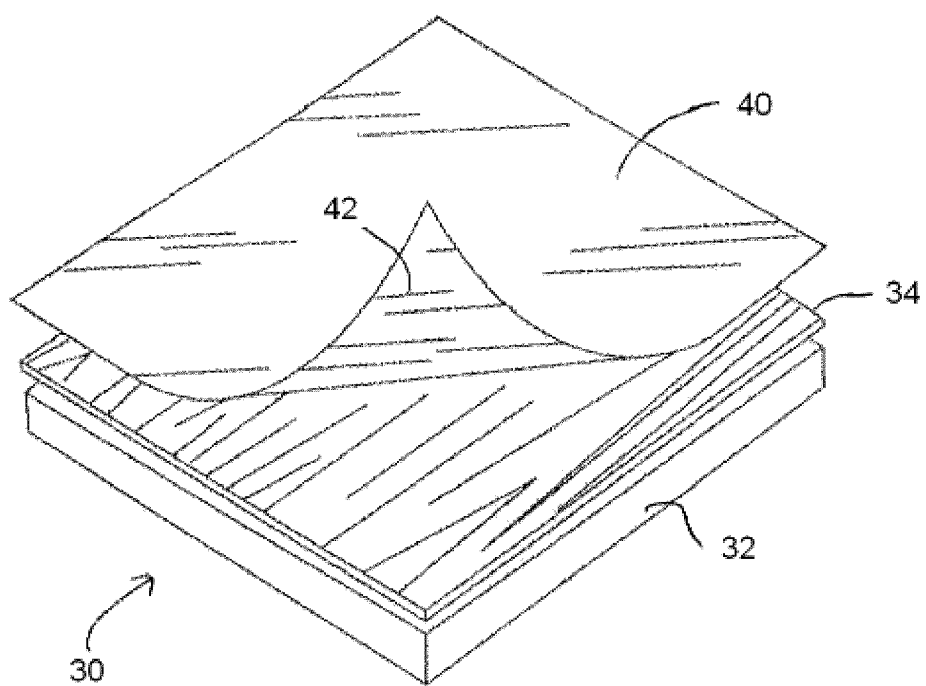
FIG. 7 is a perspective view of a further embodiment of the present invention, wherein the core comprises a wood veneer bonded to a core panel.

In FIG. 7, a laminated panel similar to the panel in FIG. 3 is shown, wherein core panel 30 is a wood veneer comprising a particleboard base panel 32 to which a wood veneer 34 has been glued prior to laminating paper 40 to the top of veneer 34. Paper 40 is an elastomeric resin impregnated single finishing printed paper, similar to item 10. However, in this case, paper 40 has been printed to provide a transparent colour stain 42. This allows the wood grain appearance and grain of the veneer 34 to be seen, through paper 40, once paper 40 is laminated to core panel 30.

Figure 8:
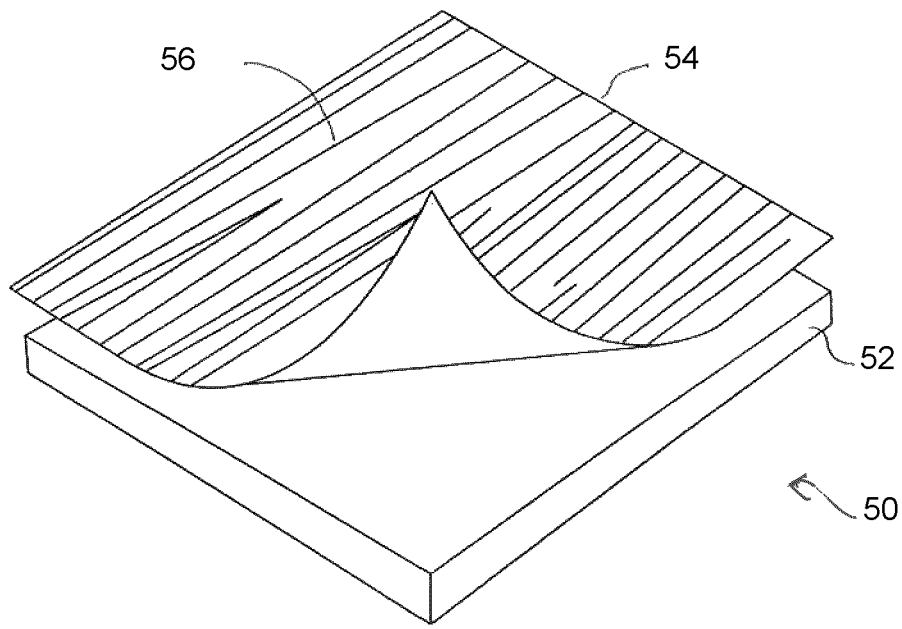
FIG. 8 is a perspective view of a printed paper layer after impregnation with an elastomeric resin, of use in the practise of the present invention; wherein the paper layer is an opaque, solid coloured paper with a printed image on the top surface.

In FIG. 8, a further embodiment of a laminated panel 50, according to the present invention is shown wherein an HDF core panel 52 has an elastomeric resin impregnated single finishing printed paper layer 54, positioned above core panel 52. Paper layer 54 is an opaque, solid coloured paper with an printed image 56, on its top surface. This assembly is pressed and optionally embossed, as previously described.

Figure 9:
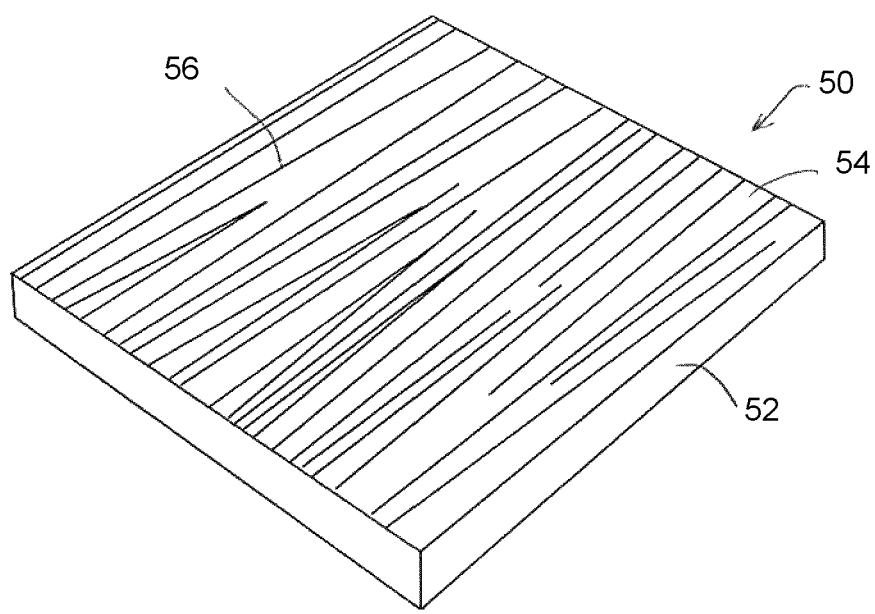
FIG. 9 is a perspective view of the core panel and printed paper of FIG. 8, after pressing and embossing.

After pressing and embossing, laminated panel 50, as shown in FIG. 9, is provided having a textured, finish on one surface, and the HDF core layer 52 is not visible through paper layer 54.

Thus, it is apparent that there has been provided, in accordance with the present invention, a laminated panel, and decorative printed paper, which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practised in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

What is claimed is:

1. A treated single finishing printed paper for use in the production of a laminated panel, comprising a printed paper layer which paper has been treated with, or impregnated with, an elastomeric resin, and wherein said single finishing printed paper is produced in a roll form.

2. A treated single finishing printed paper as claimed in claim 1 wherein an image is printed directly onto a paper layer after said paper layer has been treated with, or impregnated with, said elastomeric resin.

3. A treated single finishing printed paper according to claim 1, wherein the elastomeric resin comprises at least one selected from the group of natural and/or synthetic resins, or combinations thereof, having with elastomeric properties including any one or a combination of elastomeric thermosetting or thermoplastic resins including polyethylene (PE); Polyurethanes; Polypropylene; Ethylene vinyl acetates; Ethylene vinyl alcohol; Polyesters; Polyolefin; elastomeric-modified Melamine thermoset resins, Urea and Urea-modified thermoset resins; ESI (ethylene styrene interpolymer), or any of the styrene acrylic copolymers and Acrylic resins; rubber based materials, silicone, fluorocarbon, acrylamide, epichlorohydrin, and/or carboxylated natural and synthetic latexes; or combinations thereof.

4. A treated single finishing printed paper according to claim 3, wherein said polyethylene grade is LLDPE (Linear Low-density Polyethylene), LDPE (Low-density Polyethylene), MDPE (Medium-density Polyethylene) or HDPE (High-density Polyethylene), said Polyolefin is TPO (Thermoplastic polyolefin), or wherein said rubber based material is NBR (nitrile butadiene), SBR (styrene butadiene) or CR (chloroprene).

* * * * *